US005249734A

United States Patent [19]

Pilao

[11] Patent Number: 5,249,734

[45] **Date of Patent: * Oct. 5, 1993**

[54] ROTOR DISC FOR A REFINER AND METHOD OF FORMATION THEREOF

[75] Inventor: Milton Pilao, Sao Paulo, Brazil

[73] Assignee: Atlanta Import Export Corp., Atlanta, Ga.

[ * ] Notice: The portion of the term of this patent subsequent to Jan. 12, 2010 has been disclaimed.

[21] Appl. No.: 668,702

[22] Filed: Mar. 12, 1991

Related U.S. Application Data

[60] Continuation of Ser. No. 443,509, Nov. 30, 1989, abandoned, which is a division of Ser. No. 318,563, Mar. 3, 1989, abandoned.

[51] Int. Cl.[5] .......... B23K 31/02

[52] U.S. Cl. .......... 228/182; 29/889; 241/298

[58] Field of Search .......... 241/296, 297, 298; 228/182, 185, 189; 29/525.1, DIG. 48, 889, 889.22; 51/206 R, 206 P, 209 R

[56] References Cited

U.S. PATENT DOCUMENTS

| | | | |
|---|---|---|---|
| 2,760,624 | 8/1956 | Compton | 29/156.8 R X |
| 2,807,871 | 10/1957 | Wagner et al. | 29/889 |
| 4,827,588 | 5/1989 | Meyer | 29/156.8 R |

FOREIGN PATENT DOCUMENTS

| | | | |
|---|---|---|---|
| 1252388 | 11/1986 | Japan | 241/298 |

*Primary Examiner*—Joseph M. Gorski

*Attorney, Agent, or Firm*—Jones & Askew

[57] ABSTRACT

The present invention discloses an improved rotor disc for a refiner and its method of formation. The invention comprises a plurality of blade members spaced apart by a spacer between each adjacent blade member. Dams may be provided on the spacers. In forming the preferred disc, the plurality of blades and spacers are secured one to the other to form a blade segment. A plurality of blade segments are affixed one to the other to, in turn, form the disc. The invention is characterized by an absence of any mounting plate or base member. The method of the invention is characterized by a continuous weld along either of the inner circumference or the outer circumference of the disc.

2 Claims, 4 Drawing Sheets

ROTOR DISC FOR A REFINER AND METHOD OF FORMATION THEREOF

The application is a continuation of U.S. application Ser. No. 443,509, filed on Nov. 30, 1989 and now abandoned, which is a divisional of U.S. application Ser. No. 318,563, filed on Mar. 3, 1989 and now abandoned.

TECHNICAL FIELD

The present invention relates to fiber processing equipment utilized in the wood pulp and paper industries. More particularly, the present invention relates to a rotor disc for a refiner and its method of formation.

BACKGROUND OF THE INVENTION

Paper can be manufactured from a variety of materials. Rags, for example, are used for the highest quality paper. Lower quality paper can be made from seed fibers, jute, flax, grass and other plants. The largest amount of paper today, however, is made from wood pulp.

Wood pulp manufacture typically begins with cutting trees, trimming the cut trees into logs and de-barking the logs to provide the raw wood material. The logs are sliced and the slices broken into chips. The chips are screened or torn to obtain a plurality of chips of a given size. This is often accomplished by delivering the wood chips to a refiner wherein the chips are torn to provide a raw fibrous pulp containing fibers of a desired length and size. The raw pulp is oftentimes washed and bleached to remove impurities. The purified, but yet raw, pulp is then delivered to a second refiner or a series of refiners that beat the pulp to a desired degree. One skilled in the art will appreciate that the refining process affects the length of the fibers, their plasticity and their capacity for bonding together in the papermaking machine. The quality of the finished product is determined more at the time of refining than at any other time in the paper production process. At the conclusion of the refining process, the pulp "stock" is suitable for introduction into a papermaking machine.

Different types of refiners are known. Some refiners are provided with cone-shaped beater rolls in a similarly shaped housing. Other refiners are provided with substantially round discs. Disc refiners typically include a mass chamber having an inlet for the incoming unrefined pulp material and an outlet for the refined pulp. Some disc refiners provide one rotating and one stationary disc, whereas others provide two rotating discs. The discs face one another and, through rotation of one or both discs, frictionally engage the stock to refine the pulp. U.S. Pat. No. 3,984,057, for example, describes a refiner with three coaxial discs; the outer discs are stationary and the intermediate disc is rotated by a power-driven shaft.

The pulp-engaging face of any refining disc is conventionally provided with a plurality of spaced blades, each of a predetermined thickness, height, and angular position. Dams are conventionally provided within the spaces so as to better process the stock. The arrangement of the blades and dams is, in part, dictated by the type of wood to be processed (i.e. hard, soft or otherwise) as well as by the desired parameters for the resulting end product, be it pulp or wood stock. It is therefore to be understood that, in operation of a refiner, a mixture of wood chips and water is delivered to the mass chamber and directed between at least two discs, engaged by the blades and dams thereof and, by friction, torn or ground into a pulp.

The manufacturing process employed for producing a refining disc is both show and complex. This is particularly so for an intermediate rotor disc, because it has two refining faces. One method of manufacturing a refining disc is to cast the disc (and blade pattern) as one solid piece. Typical materials for this method are carbon steel, iron or stainless steel. Regardless of material, the blades and dams must be machined or tooled in order to assure precise alignment, angular relationship and proper blade/dam configuration. A related method calls for the production of a frame consisting of two or more concentric rings interconnected by spaced, radially extending rods. The blades and dams are fixed, usually by welding, to the frame. Alternatively, a plurality of steel plates may first be fixed to the frame, and then the blade and dams may be fixed to the plates. Of course, for a double face disc the process is done twice. These methods have several disadvantages, many of which are explained in the commonly owned U.S. Pat. No. 3,614,826. Any foundry method of manufacture is a lengthy process. This particular foundry process is labor intensive, requiring skilled workmanship. Further, a refining disc made from cast iron or the like is very heavy. The sheer mass of the disc increases the refiner's operating costs and makes replacement difficult, causing long periods of down time. Specifically, the excessive weight of the disc wears on the motor utilized to rotate the disc. In addition, the steel casting process results in plates and blades that are porous and brittle.

Those skilled in the art will appreciate that the cutting action or refining efficiency of a refiner depends, in large part, on the number of blades; the more blades per given area, the stronger and more efficient the tearing action of the disc. Thus, another disadvantage with these prior art methods is that it is relatively impossible to cast a refiner disc with tall and/or thin blades spaced closely together or in complicated patterns. This results in poor stock distribution and processing. The foundry method also results in a loss of about 70% of the material used in the refining discs due to the wear on the blades.

Another method of manufacturing refiner discs was developed in response to these disadvantages. Specifically, refiner discs have been manufactured by welding stainless or carbon steel blades onto a base in the pattern or arrangement desired. To manufacture a two-sided rotor disc, blades are welded to both sides of the base. Specifically, the blades are individually welded along their bottom edges so as to be fixedly secured to the base. The completed disc, whether one-sided or two-sided, is secured within the refiner in the conventional manner.

The welding process is a lengthy process, requiring skilled workmanship. While not as heavy as cast iron refining discs, the discs manufactured according to the welding method are relatively heavy, which significantly contributes to the refiner's operating costs. The heat generated by the welding process softens the blades, resulting in a decrease in the useful life of the refining disc. Further, the blade-by-blade welding process is expensive in terms of materials, time and manpower.

Accordingly, there is a need for an improved rotor disc for a refiner that is less expensive to manufacture in terms of labor, time and materials costs; more efficient in terms of cutting strength, pulp stock distribution and fiber treatment, conserves energy and other refiner operating costs, and offers an increase in useful performance lifetime. Moreover, the preferred refiner disc would be relatively lightweight and easily installed.

SUMMARY OF THE INVENTION

The present invention solves the above-described problems in the prior art by providing a welded rotor disc that preserves the original hardness of the blade elements and significantly reduces the weight of the disc. As a result, the life and operating efficiency of the rotor disc area increased. The method of the present invention reduces manufacturing cost in terms of time, labor and materials.

Generally described, the present invention comprises a plurality of refining blades alternately positioned between a plurality of spacers. The blades and spacers are fixedly secured one to the other in a predetermined arrangement of a certain number to provide an annular segment or blade sector. A plurality of blade sectors are fixedly secured one to another to provide a completed refiner disc. Of course, the spacers may be provided with dams to enhance the refining capability of the disc.

It is to be understood that the preferred blades of the present invention are of a height substantially greater than, and preferably twice that of conventional blades. Thus, it will be appreciated that a first teaching of the present invention is the elimination of the base member to which conventional blades have heretofore been secured. As a result, the weight of the disc is substantially reduced, providing corresponding benefits in refiner operating costs.

According to the method of the present invention, the blades and spacers are secured one to another by a continuous weld about the inner and outer circumference of a disc. Thus, it will be further appreciated that a second teaching of the present invention is the elimination of the manufacturing step of individually welding along the base edges of each blade length. Rather, the method of the present invention comprises the step of welding continuously about the outer and inner circumferences of a plurality of blades and blade sectors to form the completed disc. This method provides a significant reduction in manufacturing costs in terms of time, labor and materials. Moreover, because the length of each blade is not subjected to the welding process, the blades of the completed double-faced rotor disc retain their original hardness, resulting in a greater disc life expectancy and increased tearing efficiency.

Accordingly, it is an object of the present invention to provide an improved refining disc for use in refiners of pulp or other types of fibrous stock used in paper making and related industries.

It is another object of the present invention to provide an improved refining disc whose manufacture is simplified in order to conserve time, labor and materials.

It is another object of the present invention to provide an improved refining disc the use of which results in better stock distribution and fiber treatment by the refiner.

It is another object of the present invention to provide an improved refining disc, the use of which conserves energy and other operating costs.

It is another object of the present invention to provide an improved refining disc that provides a longer useful performance lifetime.

It is another object of the present invention to provide an improved refining disc which is lighter in weight than previous refining discs.

It is another object of the present invention to provide an improved refining disc wherein the blade elements maintain their original degree of hardness.

It is another object of the present invention to provide an improved refining disc which is readily installed or replaced, thereby resulting in less downtime of a refiner.

It is another object of the present invention to provide an improved refining disc that enjoys the benefits of a welded manufacturing process, but overcomes the shortcomings thereof.

It is another object of the present invention to provide an improved double-faced rotor refining disc without use of a base plate or like member.

It is another object of the present invention to provide an improved method of manufacturing a double-faced rotor disc for a refiner.

It is another object of the present invention to provide an improved method of manufacturing a double-faced rotor disc by eliminating the manufacturing step of welding along the bottom or base length of each blade.

These and other objects, features and advantages of the present invention may be more clearly understood and appreciated from a review of the following detailed description of the preferred embodiment and by reference to the appended drawings and claims.

DETAILED DESCRIPTION

Figure 1:
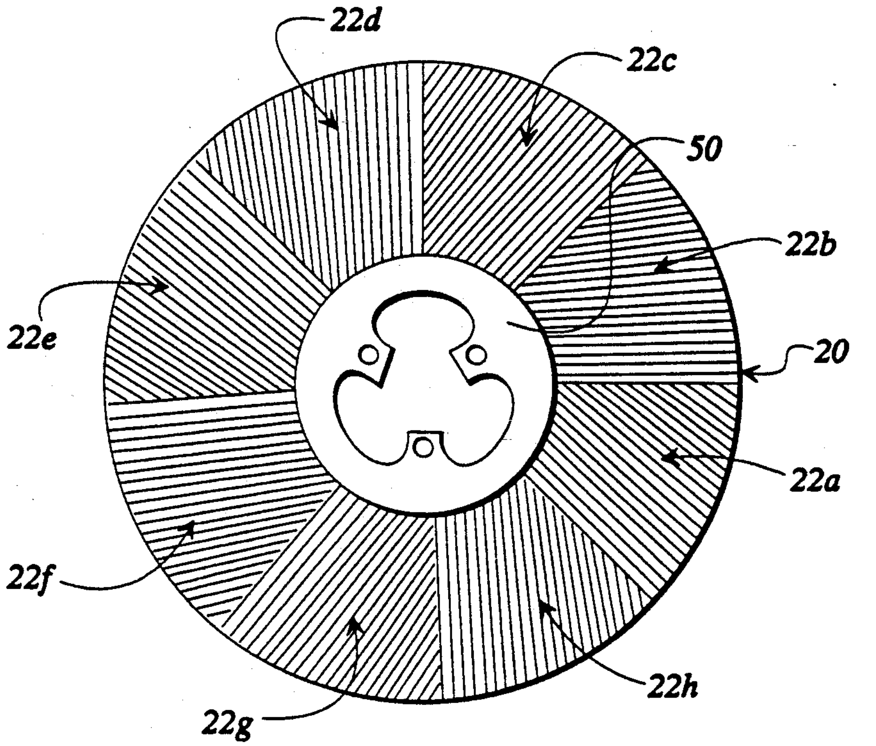
FIG. 1 is a plan front view of the preferred embodiment of a refining disc manufactured in accordance with the present invention.

Referring now to the drawings, in which like numerals indicate like elements throughout the several figures, FIG. 1 illustrates a refining disc 20 composed of annular segments 22*a–h* arranged around a central element 50. The refining disc 20 of the preferred embodiment of the present invention is of conventional size and shape as commonly used in conjunction with refiners for processing the wood pulp stock. The refining disc 20 defines a first pulp engaging face 24. It is to be understood that the disc 20 also defines a second correspondingly configured pulp engaging face (not shown) on the opposite side thereof. The control element 50 is attached to the refining disc 20 in any suitable manner. FIG. 12 shows alternatively configured central elements 50, which are discussed in greater detail hereinbelow.

Figure 2:
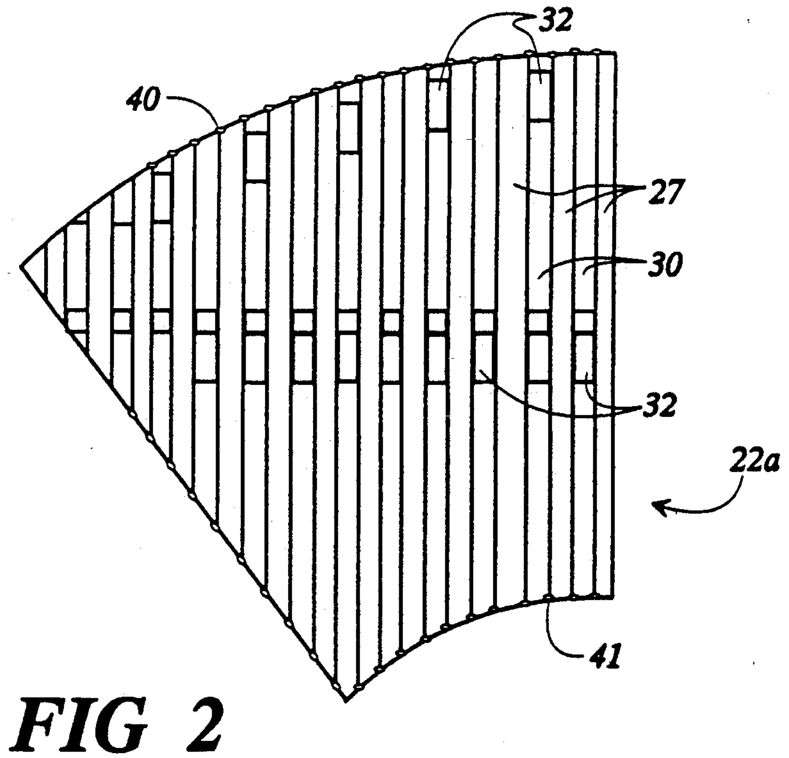
FIG. 2 is a front plan view of an annular segment of the refining disc shown in FIG. 1.

FIG. 2 illustrates a front view of the annular segment 22*a* constructed in accordance with the preferred embodiment of the present invention. Those skilled in the art will appreciate that, but for an alternative alignment of blade elements, annular blade segment 22*a* is substantially identical in construction and the method of formation, to blade segments 22*b–h*. Thus, only blade segment 22*a* is described in detail.

Figure 3:
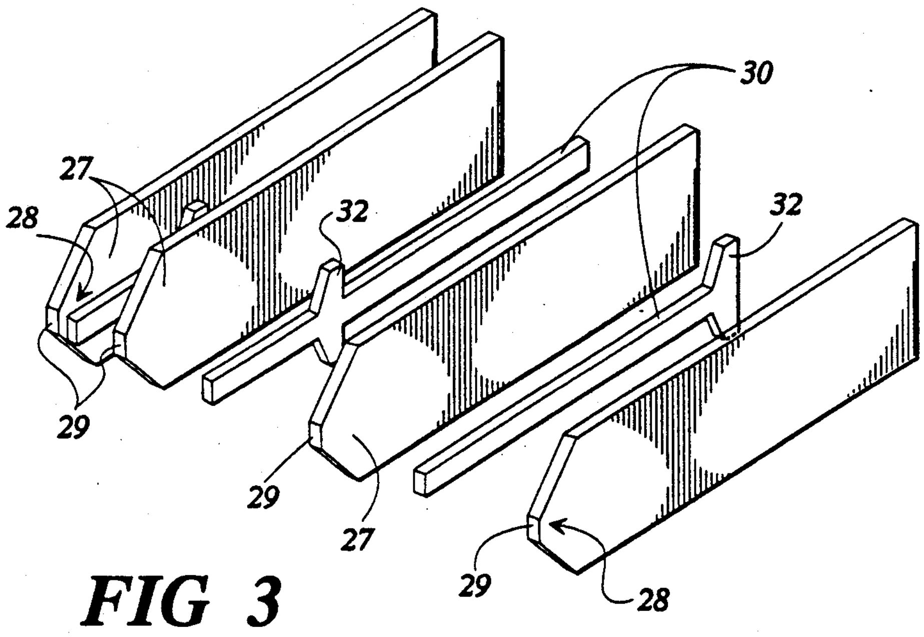
FIG. 3 is an exploded perspective view of the alternately arranged blades and spacers of the annular segment shown in FIG. 2.

The annular segment 10 is composed of interconnected and alternately arranged blades 27 and spacers 30. FIG. 3 illustrates the alternately arranged blades 28 and spacers 30 of one embodiment of the present invention. Each of the blades 27 are generally rectangular in shape, providing a narrow end 28 which is peaked so as to form a convenient ridge 29 for welding as described in detail below. The blades 27 may be made of any suitably rigid material. A preferred material is stainless steel. The blades 27 are each of a height of a convention disc. Thus, the blades 27 substantially equivalent to that are roughly twice the height of a conventional refining blade.

The spacers 30 are also generally rectangular in shape and are necessarily as long as the blades 27, but not necessarily as wide or as high. A spacer 30 is placed between two blades 27 so as to form a channel 31 to allow for the passage of the stock. In this embodiment, the spacers 30 are provided with integral dam members 32 for better processing of the stock. Dams 32 are well known in the art and, accordingly, need not be disclosed in greater detail.

Figure 5:
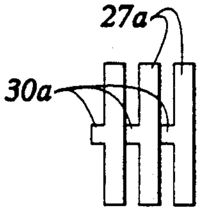
FIG. 5 is a top partial view of an annular segment formed by the alignment of blades and spacers shown in FIG. 4.
Figure 4:
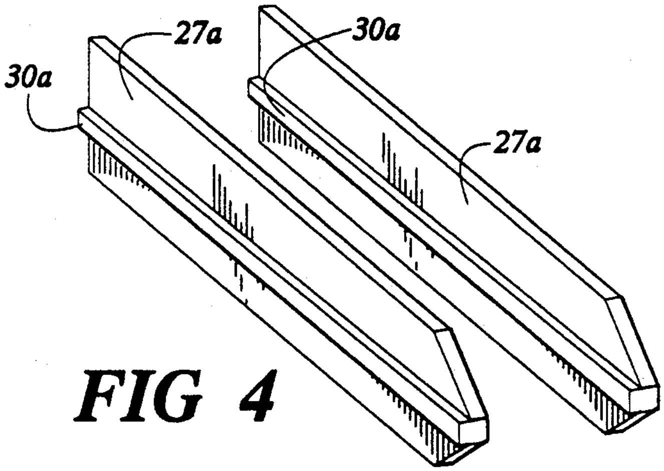
FIG. 4 is a perspective view of two blades with spacers integrally formed on one side of each blade, thereby showing a second preferred embodiment of the present invention.
Figure 7:
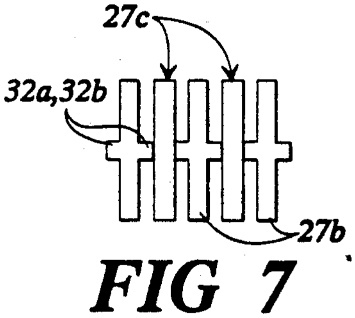
FIG. 7 is a top partial view of an annular segment formed by the alignment of blades and spacers shown in FIG. 6.
Figure 6:
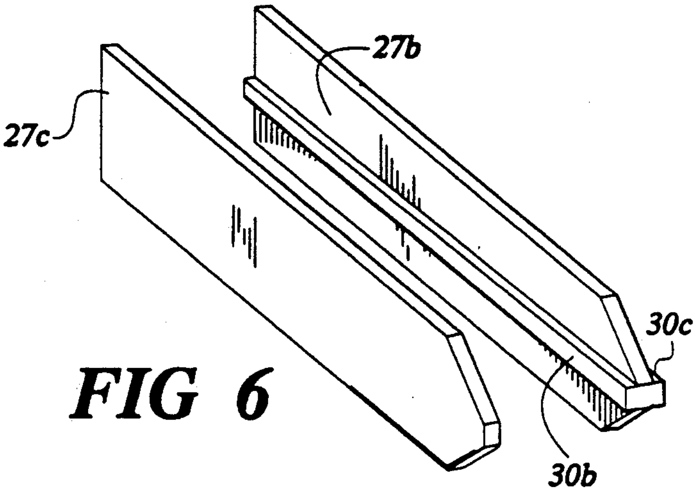
FIG. 6 is a perspective view of a blade and a spacer, the blade having two spacers integrally formed on both sides thereof, thereby showing a third preferred embodiment of the present invention.

Preferred materials for the construction of the spacers include steel, wood and plastic, or any other suitably rigid material. Alternative forms of the blades 27 may be provided. For example, FIG. 4 shows blades 27*a* with integrally formed spacers 30*a*. The advantage of such a construction is that the disc assembly process is shortened by virtue of the omission of any step for securing a separate spacer to a blade. FIG. 5 shows the positioning of the blades 27*a* for welding in accordance with the present invention as described in detail below. Similarly, FIG. 6 shows a blade 27*b* with integrally formed spacers 30*b* and 30*c* that project from opposite sides of the blade. The embodiment of FIG. 5 further shows a blade 27*c* formed without any spacers for use with the blades 27*b*. FIG. 7 shows the positioning of the blades 27*b* and 27*c* for welding in accordance with the present invention as described in detail below.

A common teaching of each disclosed embodiment of blade and spacer configuration and alignment is that the blade is approximately twice the height of a conventional blade, thereby providing the standard height of a refining disc while omitting the use of any mounting plate or base member typically used when manufacturing a welded double face rotor disc. It will be further appreciated that so long as the blades and spacers are symmetrically formed, the configuration on one face of a double-faced rotor disc will mirror that of the other face. This is, of course, of no limitation on the present invention since one of ordinary skill in the art could readily configure one face differently from the other.

Figure 8:
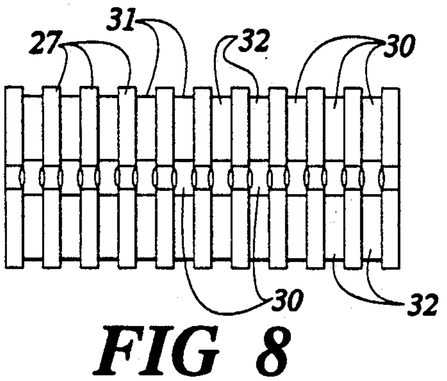
FIG. 8 is an end view of the annular segment of FIG. 2, showing the welding cord which interconnects the blades and spacers at a top circumference thereof.
Figure 9:
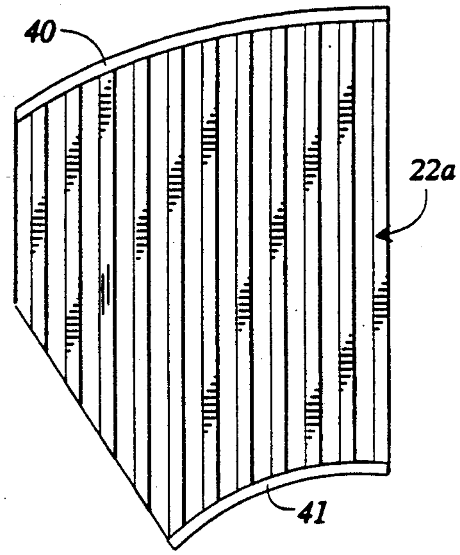
FIG. 9 is a front plan view of an annular segment whose blades and spacers are welded one to the other by continuous weld cords at an inner circumference and an outer circumference.
Figure 10:
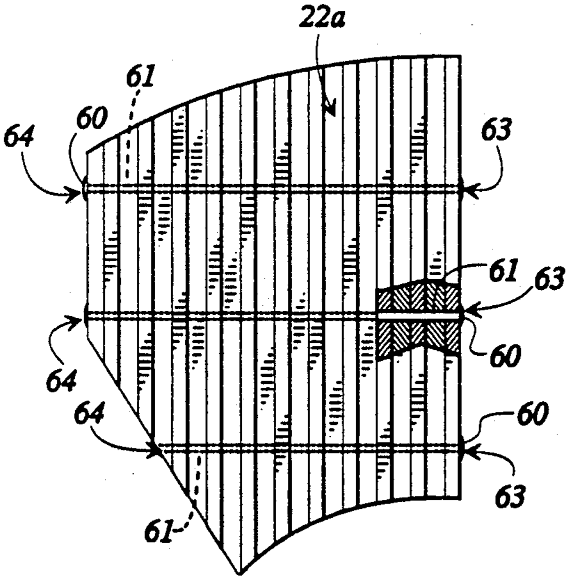
FIG. 10 is a front plan view of a preferred embodiment showing the welding of two annular segments in accordance with the present invention.

FIG. 8 shows the weld cord of the preferred embodiment of FIG. 2. More particularly, a weld cord 40 is made only of the ends 28 of the blades 27 and the spacers 30. In this manner, the blades 27 and spacers 30 are secured one to the other to form the annular segment 22*a* or blade sector. A like weld cord 41 is made at the opposite end of the blades 27 and spacers 30 so as to fixedly secure the elements at each end. Thus, as shown in FIG. 2, the inner circumference of the annular segment 22*a* is secured with a weld cord 40 and the outer circumference of the annular segment 22*a* is secured with a weld cord 41. This arrangement is further shown in FIG. 9, which illustrates that the weld cords 40 and 41 are continuous about the lengths of their respective circumferences. FIG. 10 further shows the welding of the two annular segments 22*a* and 22*b*, thereby demonstrating that regardless of blade alignment, the welds 40 and 41 remain continuous about the inner and outer circumferences of the refining disc 20.

Figure 11:
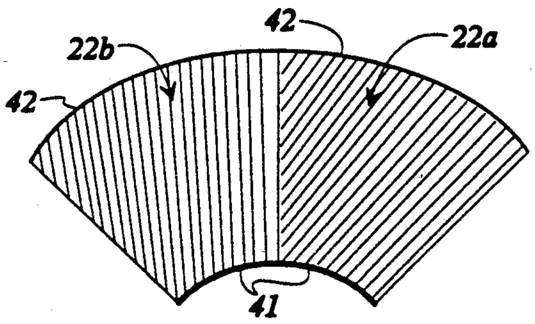
FIG. 11 is a front plan view of an annular segment whose blades and spacers are held together by transverse rods, one of which is shown in cut away, thereby showing yet another preferred embodiment of the present invention.

Welding is the preferred means of securing the blades 27 and spacers 30. However, one skilled in the art will appreciate that yet other means may be employed. Turning to FIG. 11, transverse rods 60 may be utilized to serve the blades 27 and spacers 30. In such a case, each of the blades 27 and spacers 30 are drilled to provide holes 61 of sufficient diameter to receive the rods 60. The rods 60 define a leading end 63 and trailing end 64. The trailing end is fitted with an integrally formed head. The leading end is preferably threaded for receipt of a nut or like reining member. The rod 60 is passed through the holes 61 until the leading edge projects slightly from the blade segment 22 and the trailing edge is flush against the blade segment. A nut or like member (not shown) is secured to the leading edge of the rod 60 to secure the blades 27 and spacers 30 one to the other. Of course, as shown in FIG. 10, a plurality of rods 60 could be utilized. Moreover, rods 60 could be used in conjunction with the weld cords 40 and 41.

Figure 12A:
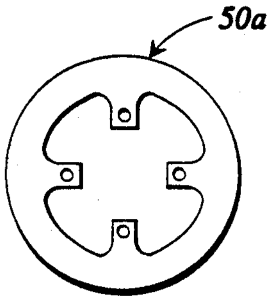
FIGS. 12A–F illustrates side views of six different central element configurations.
Figure 12B:
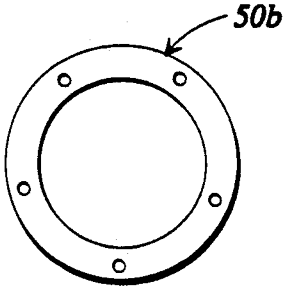
Figure 12C:
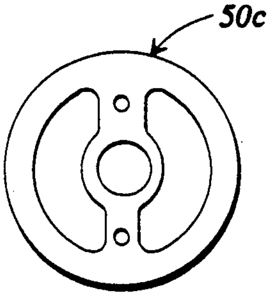
Figure 12D:
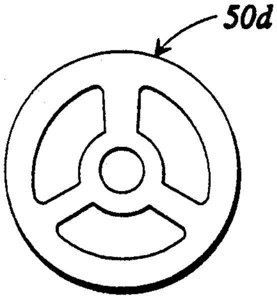
Figure 12E:
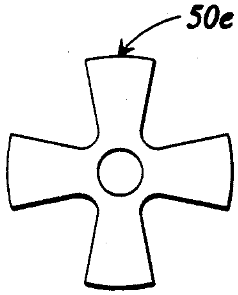
Figure 12F:
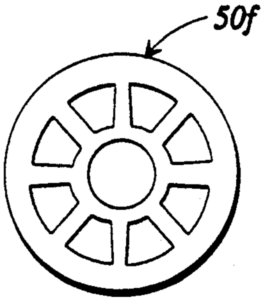

Once the disc 20 is so formed, the central element 50 is secured within and to the inner circumference of the disc. A plurality of configurations may be employed, depending essentially on the configuration of the shaft of the refiner upon which the disc is being mounted. For example, a ring-like structure with radial ears projecting into a central opening (FIG. 12*a*); a ring with holes (FIG. 12*b*); a ring with a single spoke including a central hole for fixing about the shaft (FIG. 12*c*); a ring with a plurality of spokes that converge at a central hole (FIGS. 12*d* and *f*); and a fan blade-like configuration (FIG. 12*e*). Thus, regardless of configuration, the actual element comprises a hub by which the refining disc 20 is secured to a shaft for rotation.

The present invention thus includes an improved method of manufacturing a double-faced rotor disc for a refiner, whereby a plurality of blades 27 and spacers 30 are secured on to the other to form a blade sector. A first preferred method comprises the step of welding continuously about the inner and outer circumferences of the blade sector 22*a*. A second preferred method comprises the steps of drilling holes in the blades 27 and spacers 30, then inserting rods 60 in the holes and securing the blades and spacers about the rods with conventional fasteners such as nuts, wingnuts and any like device.

It will be appreciated that, by virtue of its construction, the present invention eliminates the need for any base member or mounting plate as a component element of a double-faced rotor disc. It will be further appreciated that the method of the present invention provides for continuous welding about the inner and outer circumferences of the disc, thereby eliminating the need for welding along the bottom length of each individual blade.

The principles, preferred embodiments and modes of operation of the present invention have been described in the foregoing specification. The invention is not be construed as limited to the particular forms disclosed, because these are regarded as illustrative rather than restrictive. Moreover, variations and changes may be made by those skilled in the art without departing from the spirit of the invention as set forth by the following claims.

What is claimed is:

1. A method of manufacturing a blade sector, comprising the steps of:

aligning a plurality of blades spaced apart by spacers between adjacent blades, thereby defining an inner arcuate circumferential surface and an outer arcuate circumferential surface; and applying a continuous circumferential cord of welding material along one of said inner circumferential surface and said outer circumferential surface thereby joining said blades and spacers to each other.

2. A method of manufacturing a double-faced rotor disc for a refiner, comprising the steps of forming a plurality of blade sectors, each of said blade sectors being formed by aligning a plurality of blades spaced apart by spacers between adjacent blades, thereby defining an inner arcuate circumferential surface and an outer arcuate circumferential surface, and welding along one of said inner circumferential surface and said other circumferential surface, thereby joining said blades and spacers to each other; and aligning said plurality of blade sectors thereby forming an annular disc configuration; and welding along one of each of said inner circumferential surfaces and said outer circumferential surfaces, thereby joining said blade sectors to each other in said configuration.

* * * * *

Disclaimer 5,249,734—Milton Pilao, Sao Paulo, Brazil. ROTOR DISC FOR A REFINER AND METHOD OF FORMATION THEREOF. Patent dated Oct. 5, 1993. Disclaimer filed Jan. 12, 1998, by the assignee, Atlanta Import Export Corp.

The term of this patent shall not extend beyond the expiration date of Pat. No. 5,178,339.

*(Official Gazette,* June 2, 1998)